(12) United States Patent
Peeters et al.

(10) Patent No.: US 9,672,072 B1
(45) Date of Patent: *Jun. 6, 2017

(54) SYSTEM AND METHOD FOR MANAGING MAINFRAME COMPUTER SYSTEM USAGE

(71) Applicant: zIT Consulting GmbH, Jade (DE)

(72) Inventors: Johannes Gerardus Jozef Peeters, Jade (DE); Friedhelm Herbert Stoehler, Augsburg (DE); Horst Walter Doehler, Untermerzbach-Memmelsdorf (DE)

(73) Assignee: zIT CONSULTING GMBH, Augsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/714,990

(22) Filed: May 18, 2015

Related U.S. Application Data

(63) Continuation of application No. 14/199,364, filed on Mar. 6, 2014, now Pat. No. 9,038,090.

(60) Provisional application No. 61/773,555, filed on Mar. 6, 2013, provisional application No. 61/874,052, filed on Sep. 5, 2013.

(51) Int. Cl.
*G06F 9/50* (2006.01)

(52) U.S. Cl.
CPC ............ *G06F 9/505* (2013.01); *G06F 9/5077* (2013.01); *G06F 9/5083* (2013.01)

(58) Field of Classification Search
None
See application file for complete search history.

(56) References Cited

U.S. PATENT DOCUMENTS

| | | |
|---|---|---|
| 7,054,934 B2 | 5/2006 | Graupner |
| 7,069,558 B1 | 6/2006 | Stone |
| 7,430,741 B2 | 9/2008 | Ayachitula |
| 7,752,415 B2 | 7/2010 | Vaupel |
| 7,844,709 B2 | 11/2010 | Aman |
| 8,458,714 B2 | 6/2013 | King |
| 9,342,372 B1 | 5/2016 | Tran et al. |
| 2004/0168170 A1 | 8/2004 | Miller |
| 2011/0185062 A1 | 7/2011 | Foege |

(Continued)

OTHER PUBLICATIONS

Software ONz:, AutoSoftCapping without the Performance Problems; copyright 2010; entire document.

(Continued)

*Primary Examiner* — Qing Wu
(74) *Attorney, Agent, or Firm* — Allen Dyer Doppelt & Gilchrist

(57) ABSTRACT

In mainframe computer system, workload tasks are accomplished using a logically partitioned data processing system, where the partitioned data processing system is divided into multiple logical partitions. In a system and method managing such a computer system, each running workload tasks that can be classified based on time criticality, and groups of logical partitions can be freely defined. Processing capacity limits for the logical partitions in a group of logical partitions based upon defined processing capacity thresholds and upon an iterative determination of how much capacity is needed for time critical workload tasks. Workload can be balanced between logical partitions within a group, to prevent surplus processing capacity being used to run not time critical workload on one logical partition when another logical partition running only time critical workload tasks faces processing deficit.

9 Claims, 6 Drawing Sheets

(56) References Cited

U.S. PATENT DOCUMENTS

| | | |
|---|---|---|
| 2011/0213886 A1 | 9/2011 | Kelkar et al. |
| 2011/0283289 A1 | 11/2011 | Jayaraman |
| 2012/0030331 A1 | 2/2012 | Karampatsis |
| 2012/0311154 A1 | 12/2012 | Morgan |
| 2013/0055277 A1 | 2/2013 | Ashish |
| 2013/0091282 A1 | 4/2013 | Tontiruttananon |
| 2013/0132570 A1 | 5/2013 | Lopez Nieto |

OTHER PUBLICATIONS

Software ONz: The Sysplex Aggregation with help from ASC Software; entire document.

Pierre Gassier et al.: System Programmer's Guide to Workload Manager; (IRD) IBM Redbooks; entire document.

Frank Kyne et al.: zOS Intelligent Resource Director, WLM LPAR CPU Management; (WLM) IBM Redbooks; entire document.

*BMC Software Inc.* v. *zIT Consulting GmbH*: Petition for Post-Grant Review of U.S. Pat. No. 9,038,090 dated Feb. 19, 2016; entire document.

| GROUP: GTPM1 | MIN | MAX |
|---|---|---|
| Group Limit | 300 | 500 |
|  |  |  |
| LPA1 | 200 | 300 |
| LPA2 | 40 | 100 |
| LPA4 | 60 | 200 |

|  | IMP0 | IMP1 | IMP2 | IMP3 | IMP4 | IMP5 | IMP6 |
|---|---|---|---|---|---|---|---|
| LPA1 | BC | BC | BC | BC | BC | TC | NTC |
| LPA2 | BC | BC | BC | BC | TC | NTC | NTC |
| LPA4 | BC | BC | TC | NTC | NTC | NTC | NTC |

SYSTEM AND METHOD FOR MANAGING MAINFRAME COMPUTER SYSTEM USAGE

CROSS-REFERENCE TO RELATED APPLICATIONS

This application is a continuation of U.S. patent application Ser. No. 14/199,364 filed on Mar. 6, 2014, now U.S. Pat. No. 9,038,090, which claims the benefit of U.S. Provisional Patent Application Ser. No. 61/874,052, filed on Sep. 5, 2013, and Ser. No. 61/773,555, filed on Mar. 6, 2013, the contents of which applications are herein incorporated by reference in their entirety.

FIELD OF THE INVENTION

The present invention relates to managing mainframe computer system usage, and more particularly, to managing processing capacity limits of logical partitions executed thereby.

BACKGROUND OF THE INVENTION

In the early days of modern computing, the large size and cost of computers tended to result in a concentration of computer equipment in large data centers. Most commercial users of computers would have paid one or more data center operators to perform their computing tasks. Over the past decades, miniaturization and cost decreases have driven a trend toward more commercial computer users owning and operating their own computer systems. This trend is not universal, however.

One exception includes those computer users whose computing needs are particularly massive and/or require exceptional reliability, redundancy or security. Examples of such users include very large corporations, and especially financial sector corporations such as banks, exchanges, brokerages and the like. These types of corporations will often contract with third-party providers to supply their computing needs.

The preeminent example of a third party provider of computing services is the International Business Machines (IBM) Corporation. IBM has several thousand users who pay for the capability and reliability of its System z ("z" standing for "zero downtime") computing platform. The way users rely on the performance of the workload on the System z platform is illustrative background for the present invention's system and method for managing computer usage.

Each group of logically-related computing functions being performed for a user is referred to as a logical partition (LPAR). IBM allows users to manually set a usage limit for each LPAR, referred to as a Defined Capacity (DC). IBM also allows users to manually set a usage limit for a group of LPARs, referred to as a Group Capacity Limit (GCL—see, e.g., U.S. Pat. No. 7,752,415, the contents of which are herein incorporated by reference in their entirety). The group typically consists of all the LPARs being run on a given machine (i.e, central electronic complex—CEC), or much less frequently, a group of all LPARs being run on a given CEC that run the same type of workload. When all system parameters reflect realistic settings, capacity limitations imposed as a result of DC and GCL settings will affect the lowest workload classes (first IMP6 (also called Discretionary), then IMP5, then IMP4, etc.); however, there is no discrimination based upon what workload actually falls within those importance classes.

Workload itself enters the system using a "service class". Within each service class the workload is allocated to one of multiple workload importance levels, e.g. the first part of the workload to a high class but the longer the workload takes to execute, the lower the workload importance level gets. When classifying service classes, the following factors are important:

How time critical is the workload?
  Workload that is most time critical runs in service classes that are assigned to importance level 0 (IMP0), then importance level 1 (IMP1) etc. until the workload that is least time critical is assigned to importance level 6 (IMP6, Discretionary).
Which performance goal does the user want the workload to achieve?
  Within each service class users can define a performance goal, e.g. by defining that a percentage of the workload is expected to be finished within a certain time or using a certain defined processing capacity only (e.g. the user could define that he would like 90% of the online transactions to be finished within 0.01 seconds (clock time)).

Service class settings need to be reviewed and adjusted in a permanent process to the ever changing workload requirements.

The performance of the workload on the System z platform is determined by several factors, but most significant are the service class and the above mentioned capacity limitations using DC and GCL and/or hardware limitations.

WLM—Workload Manager—is an integrated part of the System z software. One of the functions of WLM is to monitor if the service class goals of the current workloads are being met by looking at performance indicators, such as but not limited to the 'Performance Index' (PI), MSU Activity or Delay Counter.

The consequences for workload in service classes that do not meet the performance criteria are:

In case of chronic and significant overachievement (the performance indicators are always very positive, the workload finishes faster than expected and/or defined in the goal), while at the same time recognizing that there is not enough capacity to fulfill all workload requirements (e.g. when the LPAR or group capacity is limited by DC or GCL or when the physical machine limit is reached), WLM undertakes actions that lead to degraded performance.
In case of chronicle and significant underachievement (the performance indicators are always very negative, the workload generally takes longer than expected and/or defined in the goal), while at the same time recognizing that there is not enough capacity to fulfill all workload requirements (e.g. when the LPAR or group capacity is limited by DC or GCL), WLM also undertakes actions that lead to degraded performance.

In order to guarantee optimized and reliable performance, it is therefore very important that the service class settings are realistic, especially during times of capacity shortage.

It is also important to consider that the cost to use the System z platform is determined by several factors, but a significant recurring cost for almost every user is the monthly license charge (MLC). This charge is applied for usage of proprietary IBM products that are used in connection with System z, such as the operating system (z/OS), information management system (IMS), customer information control system (CICS), relational database (DB2) and the like.

The MLC varies depending upon the usage of the IBM products during the billing period (i.e., $2^{nd}$ of month at 0:00 until $1^{st}$ of following month at 24:00). More particularly, product usage is measured in millions of service units (MSU), and the MLC is determined based on the highest average MSU usage of any full 4 hour period within the billing period (referred to as 4 Hr Rolling Average Usage). Thus, controlling the MLC involves, in large part, controlling peak MSU usage. DC and GCLs can be used to help control this.

While manual intervention gives users some ability to manage workload performance and costs incurred, further improvements are possible.

SUMMARY OF THE INVENTION

In view of the foregoing, it is an object of the present invention to provide improved systems and methods for managing mainframe computer usage.

According to a method aspect of the present invention, a method for managing mainframe computer system usage includes establishing a first group definition, the first group definition including first and second logical partitions executed by the mainframe computer system, and establishing a first group policy, the first group policy including first and second partition processing capacity limits, and a time criticality level for each of a plurality of workload tasks assigned to the first and second logical partitions, each time criticality level indicating whether the workload task associated therewith is time critical or not time critical. The method further includes monitoring performance of the first and second logical partitions in executing the plurality of workload tasks, and determining, based on the performance monitoring and the first group policy, if either of the first and second logical partitions has a capacity deficit or a capacity surplus. If one of the first and second logical partitions is determined to have a capacity deficit while the other is determined to have a capacity surplus, then the first and second partition processing capacity limits are automatically balanced. Establishing the first group policy can advantageously include checking scheduling criteria and selecting the first group policy from a plurality of stored first group policies based thereon.

According to another aspect, a method for managing mainframe computer system usage includes monitoring performance of first and second logical partitions in executing a plurality of workload tasks, the first and second logical partitions both defined as being within a first group, determining, based on the performance monitoring and a first group policy, if either of the first and second logical partitions has a capacity deficit, and if one of the first and second logical partitions is determined to have a capacity deficit automatically raising a corresponding one of the first and second partition processing capacity limits.

Further according to this aspect, the first group policy includes processing capacity limits and processing capacity upper and lower thresholds for each of the first group, the first logical partition and the second logical partition. The more limiting of the group and corresponding one of the first and second logical partition processing capacity upper thresholds limits any raising of the of the processing capacity limit for the first and second partition processing capacity limits in response to a capacity deficit.

Additionally, if the processing capacity limits are equal to the processing capacity lower thresholds and the performance monitoring does not identify any capacity deficit, then no processing capacity limits are raised. If a capacity surplus remains after any balancing, then applicable ones of the group, first and second processing capacity limits are lowered if above the applicable ones of the group, first and second processing capacity lower thresholds.

According to a further aspect, a method for managing mainframe computer system usage includes establishing first time criticality levels for each of a first plurality of workload tasks assigned to a first logical partition executed by the mainframe computer system. Monitoring performance of the first logical partition in executing the plurality of workload tasks is monitored, and a processing capacity limit of the first logical partition based on the performance monitoring and the time criticality level of the plurality of workload tasks is periodically and automatically adjusted. Also, establishing the first time criticality levels advantageously includes assigning the time criticality levels to workload importance classes of the first logical partition, the time criticality levels being distinct from and independent of the workload importance classes. The first time criticality levels can be different from second time criticality levels assigned to a second logical partition.

In an additional aspect, a method for managing mainframe computer system usage includes establishing a first group definition, the first group definition including a plurality of logical partitions, and establishing a second group definition, the second group definition including a subset of the plurality of logical partitions. First and second group policies are established, each including a group processing capacity limit, and a plurality of partition processing capacity limits corresponding to the plurality of logical partitions. The method further includes monitoring performance of the plurality of logical partitions in executing a plurality of workload tasks, and automatically adjusting the first and second group policies based on the performance monitoring.

Advantageously, the present invention can allow for management and optimization of processing capacity usage in a billed computer system and to ensure optimization of workload performance for critical workload by balancing the capacity between logical partitions that are grouped together and by optimizing processing capacity limit settings.

The present invention also allows for monitoring the consumption of different workload categories on every logical partition in a central electronic complex and reallocation of processing capacity from one or more logical partitions if that capacity is currently used for workload tasks that are classified as not time critical to one or more logical partitions within the same group which demand capacity for workload tasks which are classified as time critical—which can be further divided into further time criticality levels, such as time critical and "business critical." Periodically controlling the capacity usage of a group of LPARs and/or subgroups of LPARs and/or individual LPARs within defined minimum and maximum capacity ranges and periodically dividing the available capacity within a group of LPARs and/or a subgroup of LPARs in such a way that each group/subgroup of LPARs and each individual LPAR at least gets enough capacity to execute business critical or time critical workload. Groups and subgroups are defined by group names and capacity ranges, defined minimum and maximum capacity values for each group and subgroup. The individual capacity range, defining minimum and maximum capacity values, is also defined for each LPAR.

Though installation of LPARs of existing mainframe computer systems, the present invention improves existing technology and allows installations to control the capacity usage for groups and subgroups of LPARs and individual LPARs based upon a time criticality of workload tasks across LPAR boundaries. With the present invention, more efficient use of the data processing resources can be made and more efficient cost control in large IT centers is enabled by making sure that workload tasks that are not time critical do not lead to a raise in software costs.

An embodiment is characterized in that adding more capacity is done within defined upper and lower processing capacity thresholds per group and per LPAR.

Another embodiment is characterized in that each WLM importance level within each LPAR gets assigned a level of time criticality, e.g. Business Critical, Time Critical and Not Time Critical.

Workload is in general divided into importance levels. These importance levels indicate the importance of the workload within the LPAR, but not across LPARs. Thus, a further preferred embodiment of the method is characterized in that each importance level within each LPAR gets a level of time criticality assigned, e.g. Business Critical, Time Critical and Not Time Critical. These levels of time criticality can be different for each importance level within each LPAR: an importance level on LPAR1 may be categorized as Business Critical, while the identical importance level on LPAR2 is categorized as Not Time Critical.

A further embodiment is characterized in that definitions of groups, LPARs and the definition of the level of time criticality within each WLM importance level is defined within a group policy.

An additional embodiment is characterized in that multiple policies can be defined to meet the different requirements of different day and time periods, e.g. a peak time policy, an off peak time policy, a night time policy, a weekend policy etc.

A further embodiment is characterized in that a policy is automatically chosen from among stored policies is based upon the scheduling criteria, such as date and/or time of day.

Yet another embodiment is characterized in that the predictions for the capacity that is needed for each group, and each LPAR within the next time period are based upon actual consumption values of each LPAR determined by performance monitoring.

An additional embodiment is characterized in that the predictions for the capacity that is needed for each group, each subgroup and each LPAR within the next time period are done automatically and are based upon projections. These projections can vary from "conservative" to "progressive," based upon the margin of error factored thereinto The projection can be defined per LPAR, offering the advantage that LPARs which run less business critical workloads (e.g. Test LPARs, Development LPARs etc.) are projected more rigidly, and therefore with lower margins of error, than LPARs that run business critical workloads (e.g. Production LPARs).

Another embodiment is characterized in that additional capacity will only be made available to each group, each subgroup and each LPAR when the defined maximum values have not yet been reached and when the additional capacity is needed to execute "Business Critical" and/or "Time Critical" workload. Preferably, when capacity is not needed anymore to execute "Business Critical" and/or "Time Critical" workload, the available capacity of each group, each subgroup and each LPAR is reduced until the minimum of the defined range value is reached.

A further embodiment is characterized in that all changes (increases and decreases) to capacity values for groups, subgroups or LPARs are done automatically using a defined and freely useable interface.

The present invention relates further to a computer program product stored on a tangible data storage medium readable by a computer system, such a hard drive, flash memory, or other data storage device.

These and other objects, aspects and advantages of the present invention will be better appreciated in view of the drawings and following detailed description of preferred embodiments.

DETAILED DESCRIPTION OF PREFERRED EMBODIMENTS

As discussed above, the IBM System z platform is the preeminent contemporary example of third party-provided mainframe computer systems and services. Thus, the following description will be couched in terms relevant to this example. However, those skilled in the art will appreciate that the present invention could be applied to manage mainframe computer system usage in the case of other computing service providers, and particularly those with analogous billing practices.

Figure 1:
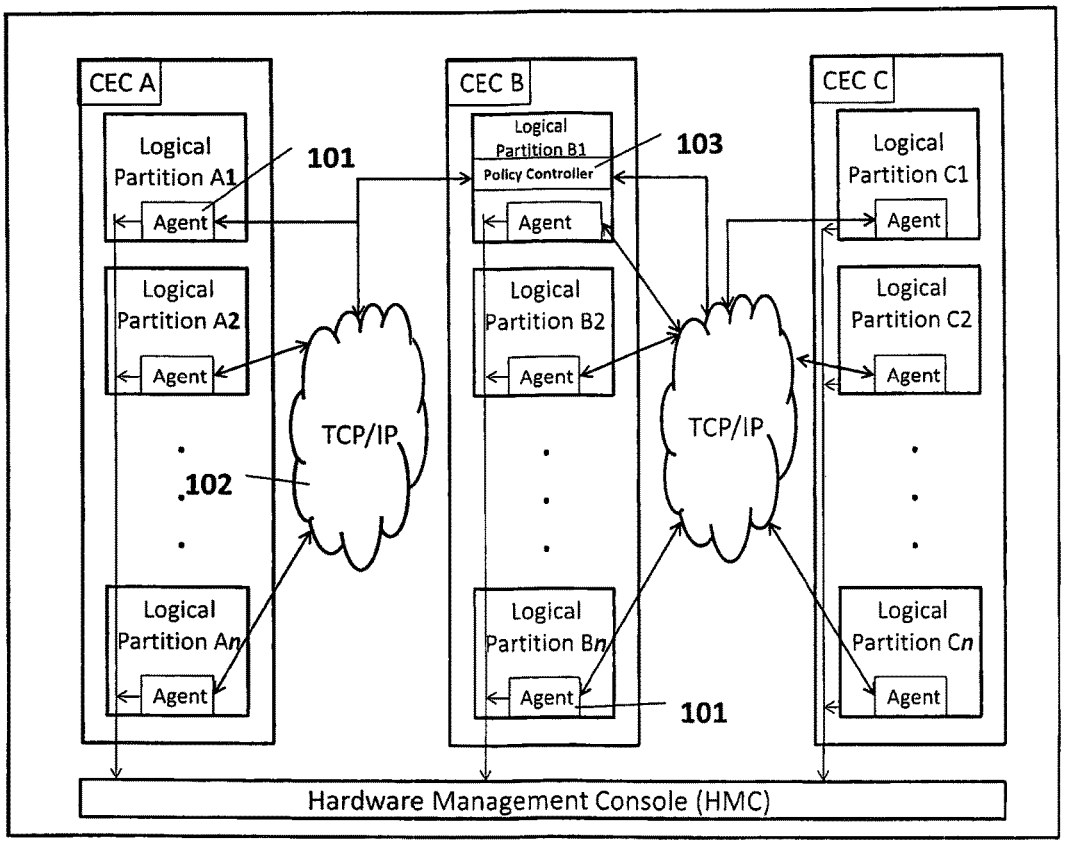
FIG. 1 is a schematic overview of a system for managing mainframe computer usage, including a policy controller and a plurality of agents installed in logical partitions executed by central electronic complexes (CECs) of a mainframe computer system, and communicating with a hardware management console thereof, according to an embodiment of the present invention.

Referring to FIG. 1, on each logical partition (LPAR) an agent 101 is installed. The 101 agent collects LPAR usage data (also refer to FIGS. 5a and 5b) and sends this data via TCP/IP protocol via a network 102 to the policy controller 103. The controller 103 uses the gathered LPAR usage information, the user defined parameters and the user defined policies to forecast the capacity requirements for the next period (also refer to FIGS. 2, 6 and 7). When changes to the current processing (MSU) capacity settings are indicated, the policy controller 103 sends a message to the agent or agents 101 involved, again using the network 102. The agent or agents 101 that receive a message involving changes to the current MSU capacity settings initiate the changes by setting off a command using the BCPii interface (also refer to FIG. 5b).

Figure 2:
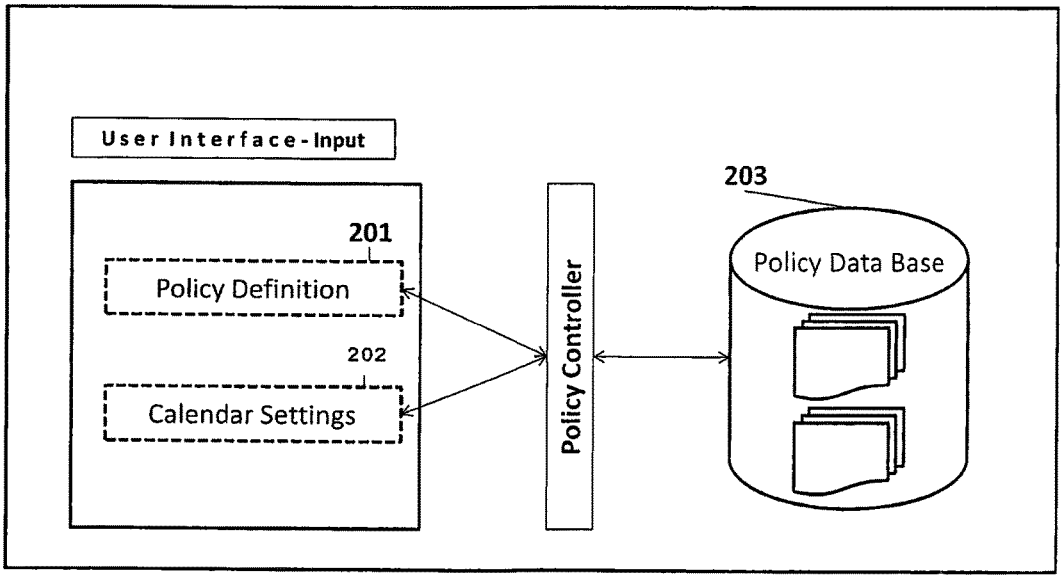
FIG. 2 is a schematic overview of a user interface through which definitions and scheduling criteria are received by the system and stored.

Referring to FIG. 2, different policy and parameter definitions are defined using a User Interface. These definitions include Policy definitions 201 (also refer to FIGS. 3 and 4): One or more policies are defined using the user interface. Within the policy all the information that the controller needs is defined: scheduling criteria (e.g. calendar date and time of day ranges), MSU capacity ranges per group, subgroups and LPARs and the level of time criticality of each of the WLM importance levels of each of the LPARs.

Calendar Settings 202: Policies contain a validity period and can be defined for weekdays, weekends, business days, non-business days etc. The calendar settings define special non-business days.

Each policy is stored in the policy database 203.

Figures 3, 4A, 4B:
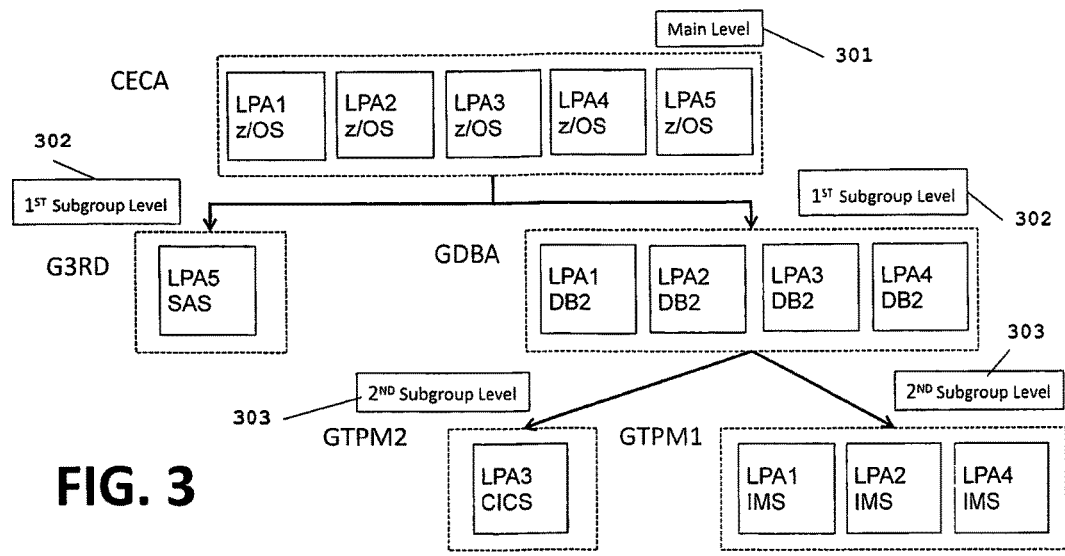
FIG. 3 is a schematic illustration of group definitions within an exemplary CEC, including groups that include subsets of the logical partitions in other groups (i.e., subgroups)
FIG. 4a is a schematic illustration of group policy definitions for an exemplary group of FIG. 3, including group and logical partition upper and lower processing capacity thresholds.
FIG. 4b is a further schematic illustration of group policy definitions for the exemplary group of FIG. 4a, including the assignment of time criticality levels to workload importance classes within the logical partitions.

Referring to FIG. 3, an example of group definitions for a CEC that is divided into 5 LPARs (LPA1, LPA2, LPA3, LPA4 and LPA5). The group CECA is on the main level 301 and includes all the LPARs defined to, enabling customers to control the usage of the operating system z/OS, which all LPARs utilize. The first subgroup level 302, includes groups with subsets of the LPARs in group CECA: G3RD with one LPAR "LPA5" only and GDBA with the other 4 LPARs. LPA5 utilizes software called SAS, thus controlling the usage of that software product, all LPARs in group GDBA utilize software called DB2, thus controlling the usage of that software. The next level 303 is the second subgroup level and also includes two groups with further subsets of the LPARs in group GDBA: GTPM2 with "LPA3" only and GTPM1 with "LPA1, "LPA2" and "LPA4". The one LPAR in GTPM2 utilizes software called CICS, thus controlling the usage of that software product, all LPARs in group GTPM1 utilize software called IMS, thus controlling the usage of that software. By defining the groups and subgroups this way, the usage of specific MLC incurring software products (z/OS, SAS, DB2, CICS and IMS) can be tightly monitored and controlled.

Referring to FIG. 4a, an example of possible policy definitions 401 for group GTPM1 is illustrated. The processing capacity (MSU) range of the group is defined between upper and lower thresholds (MIN 300 to MAX 500 MSU—at 402). The effect of this policy definition is as follows:

As long as according to the projected usage the total MSU capacity usage of all LPARs within the group stays below 300 MSU, there will be no changes to the MSU processing capacity limit for the group If the projected usage total MSU capacity usage of business critical and normal time critical workload on all LPARs within the group exceeds the defined minimum of 300 MSU and more capacity is needed to execute business critical or time critical workload, the current processing capacity limit is raised, but only if the total MSU capacity of the group does not exceed the defined maximum of 500 MSU.

Logical partition processing capacity upper and lower thresholds 403 for LPA1, LPA2 and LPA4 are illustrated. The MSU capacity range of LPA1 is set a minimum of 200 and a maximum of 300 MSU (40 to 100 MSU for LPA2 and 60 to 200 MSU for LPA4). The effect of this definition is as follows:

As long as the projected MSU capacity usage of LPA1 within the group stays below 200 MSU (40 MSU for LPA2, 60 MSU for LPA4), there will be no changes to the MSU capacity settings.

If according to the projection for the MSU capacity for the next period the usage exceeds 200 MSU (40 MSU for LPA2, 60 MSU for LPA4), it is determined if that is caused by workload that is defined as time critical (e.g., business critical or regular time critical—refer also to FIG. 4b).

If that is not case: no action

If that is the case, it is determined if the additional MSU capacity that is needed can be taken from another LPAR within the group: this is the case if according to the projection one of the LPARs uses capacity for workload that is defined as Not Time Critical:

Other LPARs within the group currently use MSU capacity for workload defined as Not Time Critical: The MSU capacity of that LPAR is reduced, the MSU capacity of the LPAR that needs more capacity is increased, and there is no effect on the total MSU capacity usage of the group.

According to the projection no other LPARs within the group uses MSU capacity for workload defined as Not Time Critical: The limit for the LPAR that needs more MSU capacity and for the group is raised.

If according to the projection for the MSU capacity for the next period the usage of the Business Critical and Time Critical workload is below the currently defined logical partition processing capacity limit, the limit for the LPAR is reduced until the defined minimum level is reached.

Referring to FIG. 4b, an example of the allocation of time criticality levels to WLM importance classes is shown, where in this example WLM importance class 404 shown "0" is shown as "IMP0", etc. The logical partitions are identified at 405. For LPA1 it is defined that WLM importance classes 0, 1, 2, 3 and 4 run business critical workload (BC), WLM importance level 5 runs regular time critical workload (TC) and WLM importance level 6 (discretionary) runs workload that is not time critical (NTC). LPA2 runs BC workload in importance levels 0, 1, 2 and 3, TC in importance level 4 and NTC in level 5 and 6. LPA4 runs BC workload in levels 0 and 1 only, TC in level 2 and NTC in levels 3, 4, 5 and 6.

For each LPAR within the group GTPM1 (refer to FIG. 4a also) the following applies:

If there is no projected MSU capacity shortage: no action

If there is projected MSU capacity shortage for workload classified as NTC only: no action If there is projected MSU capacity shortage for workload classified as time critical (TC or BC):

If the projection for at least one of the other LPARs within the group shows that they have more MSU capacity than needed to execute the BC and TC workload, than capacity is shifted from that LPAR or LPARs to the LPAR that needs more capacity to execute the BC and TC workload.

If the projection shows that all LPARs need the allocated MSU capacity to each execute their BC and TC workload, then more MSU capacity is added to the affected LPAR and the group as long as the maximum for the LPAR and for the group is not exceeded.

Figure 5A:
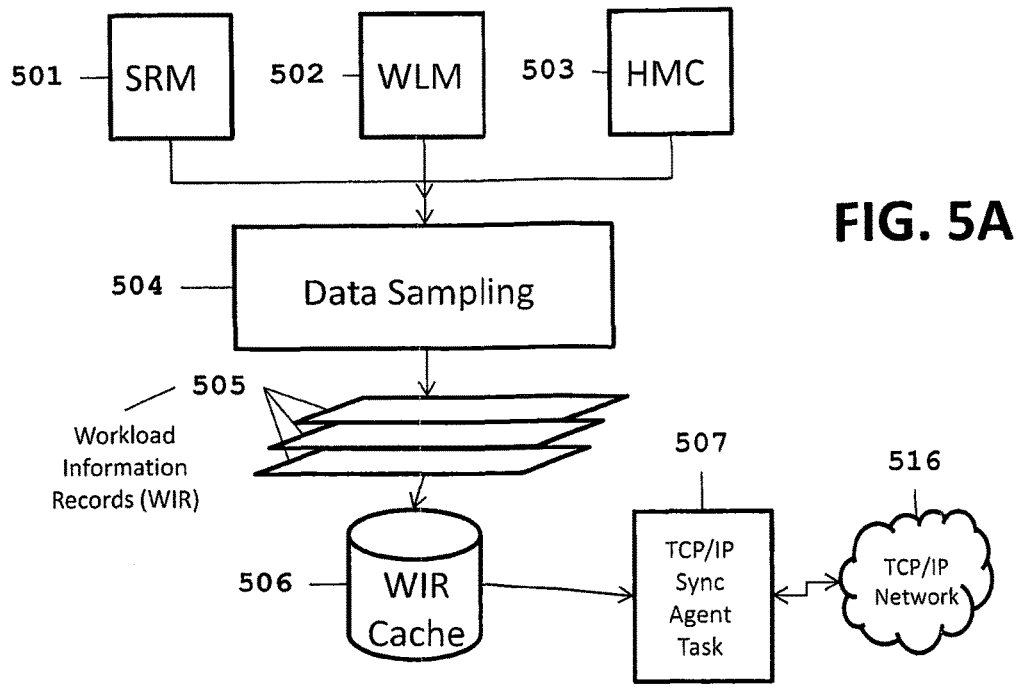
FIG. 5a is a flow diagram of the data collection process undertaken by the agents of FIG. 1.

Referring to FIG. 5a, the agent data collection process within an LPAR is shown. The agent continuously monitors the consumption of processing capacity by the workload tasks assigned to the different WLM importance classes on a logical partition. The most recent consumption values are gathered using the available standard interfaces to parts of the operating system "z/OS", such as the system resource manager (501) and the workload manager (502). In addition the hardware management console (503) is used to obtain the current settings for the LPAR. The collected consumption values are then filtered and merged (504). The output of this processing of the gathered data and its alteration is the workload information record (505) (WIR). The workload information record holds the relevant information that is used for upcoming projections and further mathematical calculations. The workload information record is stored in a local cache (506). The TCP/IP Synchronization agent task (507) is invoked to transport the workload information record using the TCP/IP Protocol network (516) to the policy controller.

Figure 5B:
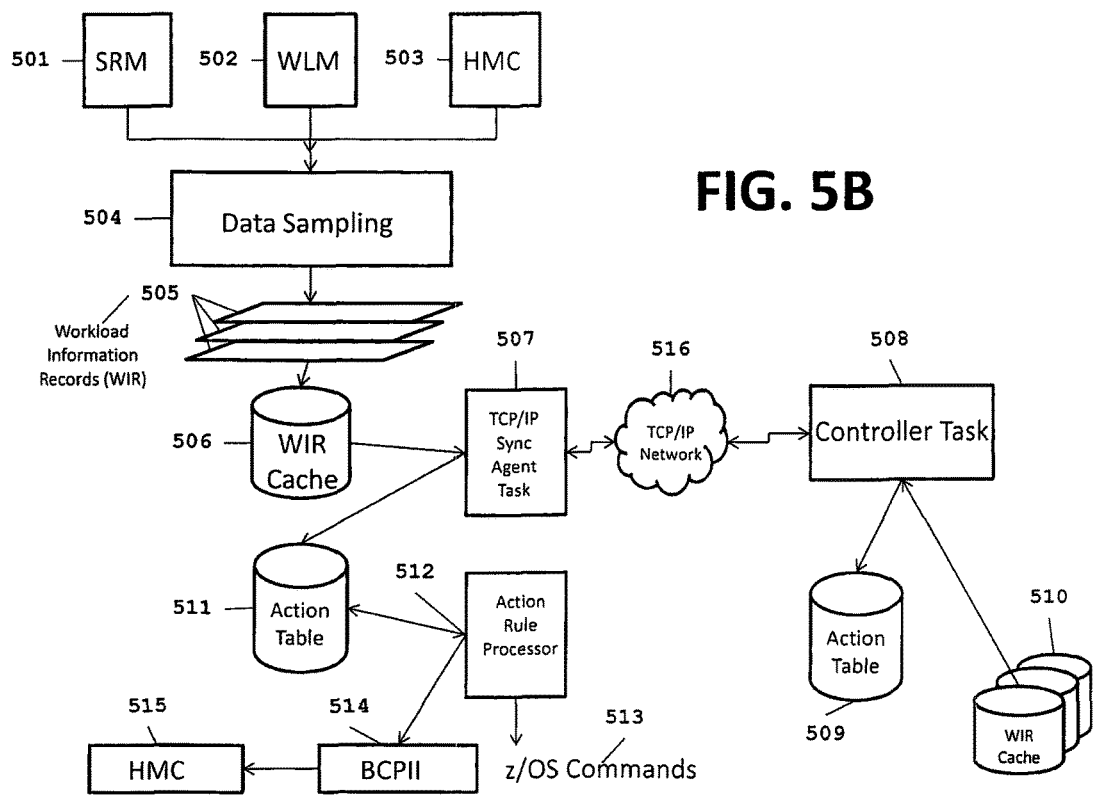
FIG. 5b is a flow diagram of the agent data collection of FIG. 5a and the interaction with the handling of tasks to be performed by the policy controller of FIG. 1.

Referring to FIG. 5b, the data collection process of an agent within a logical partition which has been specified above are shown, together with the interaction with the policy controller (508) and the handling of actions to be performed after receiving assignments from the controller. As illustrated in FIG. 1, the controller task may run on the same or another LPAR as the agent. If consumption data has been sent from an agent, the controller picks up the workload information record (510) and starts the projection and balancing decision processing for the next period. The next step is to store the action that needs to be taken by the affected LPAR into the controller's action table (509) and transmit the information via TCP/IP network (516) to the agent. After the TCP/IP Synchronization agent (507) detects a message from the policy controller, the action that needs to be taken is written into the agents action table (511) and passed (512) to the action rule processor. The purpose of the action rule processor is to request the execution of the command; for example, using the operating system z/OS (513) or the hardware management console (515) applying the BCPii interface (514).

Figure 6:
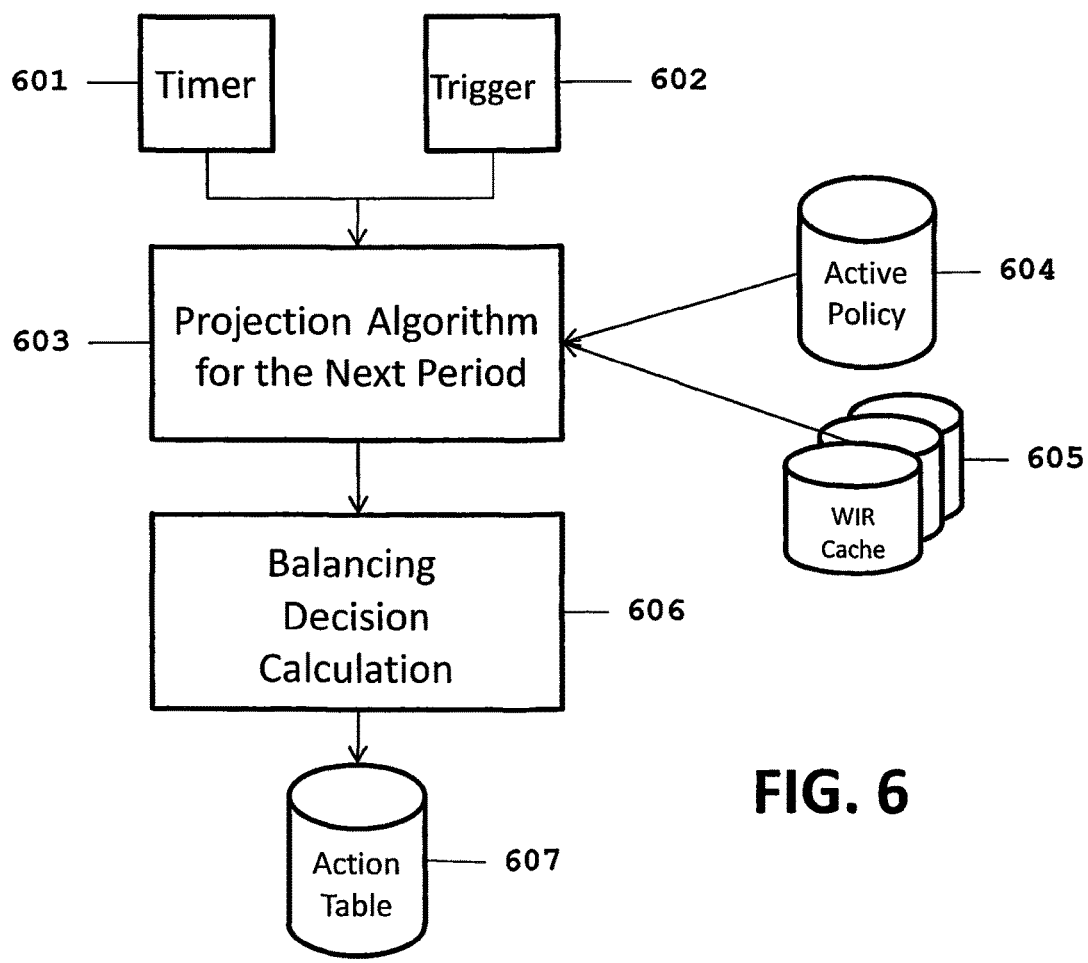
FIG. 6 is a flow diagram of operations of the policy controller of FIG. 1, including capacity projection determination and capacity adjustment.

Referring to FIG. 6, the projection and balancing decision process within the policy controller is shown. There are two options: Either the timer interval (601) or a trigger (602) can activate the controller task. Both cases lead into a recalculation of the demands based on the policy definitions in a capacity group, its subgroups and LPARS.

Figure 7:
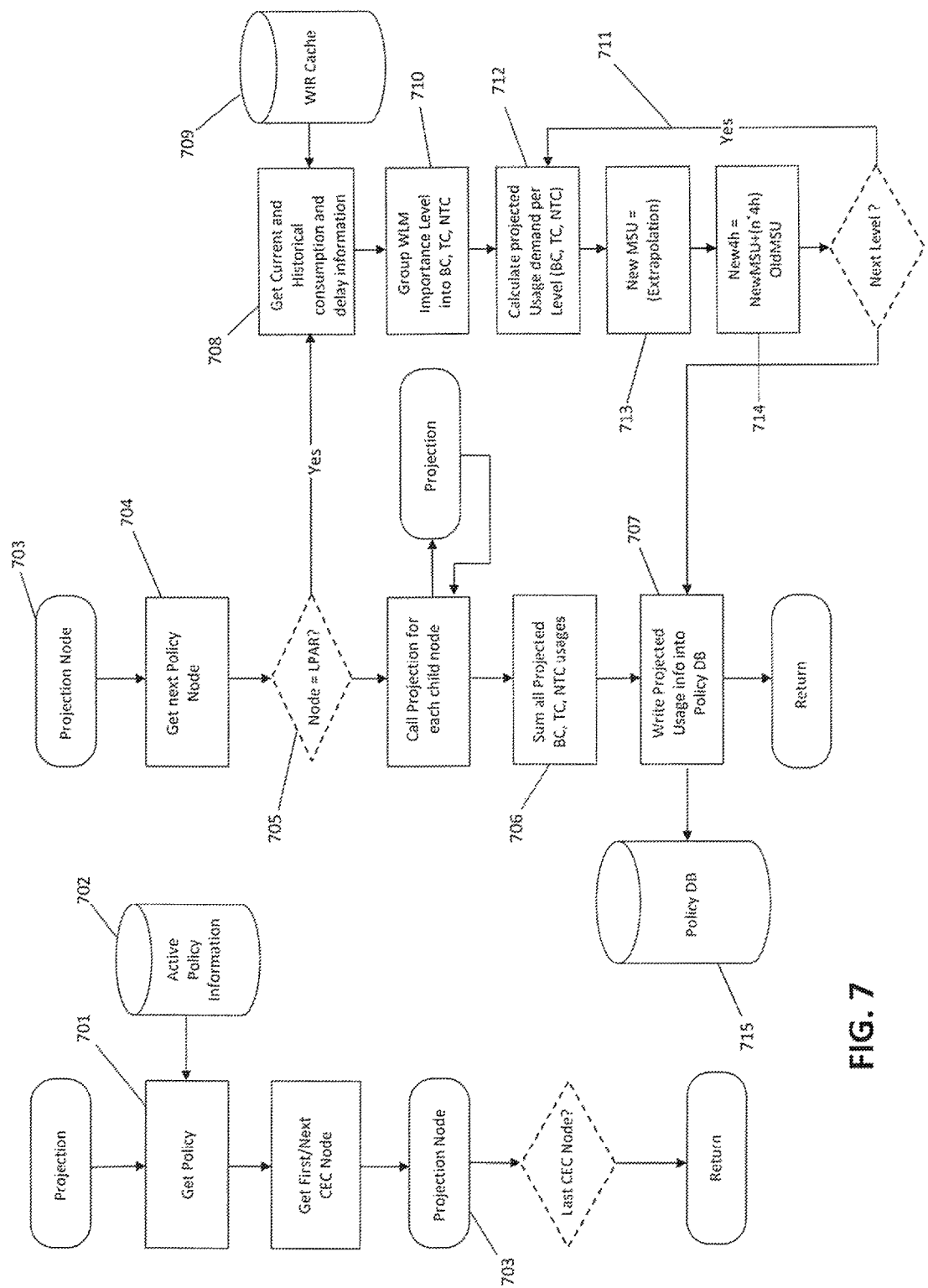
FIG. 7 is a detailed flow diagram of the capacity projection determination of FIG. 6.

The first step is the projection of the demand (603) for each group, including groups at the subgroup levels, as well as for each individual LPAR (refer to FIG. 7). The projection algorithm uses the information of the currently active policy information (604), then calculates and projects the MSU capacity demand for the next period, based upon the policy definitions (604) and the recent consumption values using the workload information record (605). The second step is to calculate and define the balancing decision (606) and write the result back into the action table (607).

Referring to FIG. 7, the processing capacity projection method is illustrated. The projection is activated either thru a trigger event or a timer. In FIG. 7 a "Node" can be a CEC (which is the largest group), a subgroup or an individual LPAR.

The projecting process includes:
  Whenever a projection process is initiated, the information about the currently active policy is read (701 and 702).
  For each CEC "projection node" is called (703)
  For each group within a CEC the projecting process is as follows:
    The information about the first (or next) policy node is read (704)
    If the Node is a group or subgroup (705):
      The "projection node" is called (703)
      All projected usages are summed up per level (Business Critical, Time Critical, Not Time Critical) (706)
      The sums of the projected usages of the group are written into the policy data base (707 and 715)
    If the Node is an LPAR (705):
      The current and historical consumption and delay information is read (708) from the Workload Information Records (709)
      The WLM importance levels are grouped along the lines of Business Critical, Time Critical and Not Time Critical (710)
      In a loop (711) the projected usage demand for each level (BC, TC, NTC) is calculated for the next period:
        Calculate the projected usage demand for the first (BC) or next levels (TC and NTC) (712 and 713)
        Calculate the new projected 4 hour rolling average value by adding the new projected demand for the next period, while at the same time taking the usage demand for the oldest period out of the calculation (714)
      The sums of the projected usages of the LPAR is written into the policy data base (707 and 715)

Figure 8:
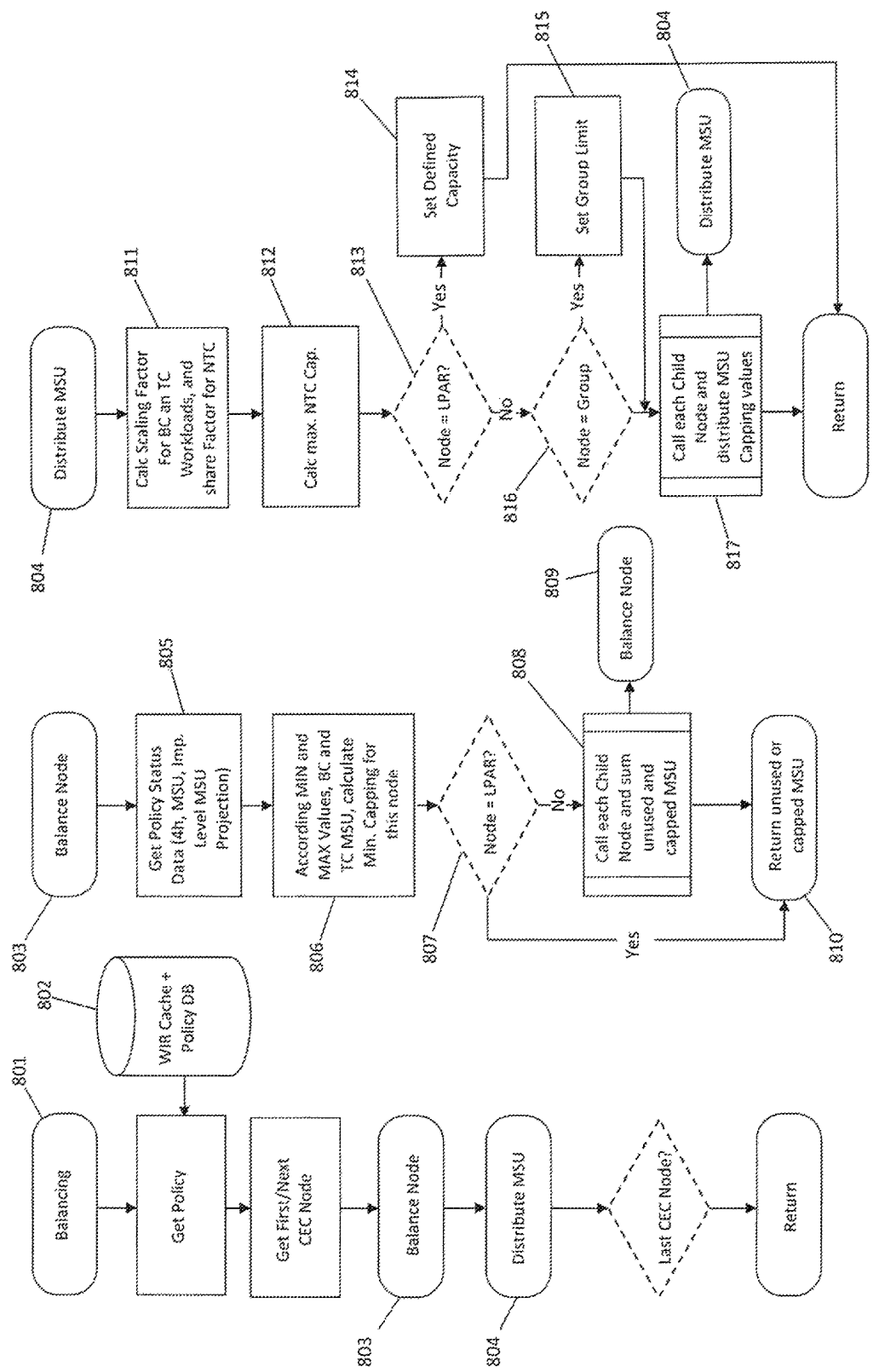
FIG. 8 is a detailed flow diagram of the capacity adjustment of FIG. 6.

Referring to FIG. 8, the capacity balancing and capacity adjustment method is illustrated in greater detail. The capacity balancing and capacity distribution executes after the workload capacity determination (e.g., projection) process. In FIG. 8 a "Node" can be a CEC (which is the largest group), a subgroup or an LPAR.

The capacity balancing and adjustment process is as follows:
  Whenever a capacity balancing process is initiated, the information about the currently active policy is read (801 and 802).
  For each CEC "Balance node" is called (803)
    The policy status data is read (805):
      The data contains projected values (refer to FIG. 7)
      Calculate minimum capping limit according to the MIN and MAX settings in the currently active policy and the settings for the criticality (BC, TC, NTC) of the importance levels (806);
    If Node (807) is a group or subgroup (808) call "balance node" (803) for each node that is within the group or subgroup to summarize unused capacity and Capped MSU values
      Return the summarized values for either unused or Capped MSU (810)
    If Node is an LPAR (807), then return giving the unused or capped MSU values (810)
  For each Group, subgroup and LPAR "Distribute MSU" is called (804)
    Calculate (811) the scaling factors for the criticality levels "Business Critical" and "Time Critical" and the share factor for "Non Time Critical" workload if unused capacity is available
    Calculate (812) the maximum capacity for "Non Time Critical" workload
    If the node is an LPAR (813):
      Set the defined capacity for that LPAR (814) and return to main program If the node is a group (816):
  Set the recalculated limit for the total capacity for the group (815)
  Solve all remaining subgroups and LPARs (817) until the projected demand available capacity for the group has been recalculated and distributed All assignments for the agents are written into the action table (refer to FIG. 6, 607). The process is repeated iteratively either a predetermined interval, or each time a designated triggering event occurs.

The above embodiments and provided for illustrative and exemplary purposes; the present invention is not necessarily limited thereto. Rather, those skilled in the art will appreciate that these various modifications, as well as adaptations to particular circumstances, will fall within the scope of the invention as herein shown and described and of the claims appended hereto.

With reference to the claims appended hereto, however, the following definitions apply:

"Capacity deficit" is defined to mean a condition where a logical partition is determined to need a processing capacity in excess of its partition processing capacity limit to satisfactorily perform all of its time critical workload tasks. "Capacity surplus" is defined to mean a condition where a logical partition is determined to have processing capacity in excess of that needed to perform all of its time critical workload tasks. Capacity deficit and capacity surplus can be determined by projection and/or current measurement.

"Balancing," as applied to partition processing capacity limits of logical partitions within a group, is defined to mean directing the raising the partition processing capacity limit(s) of logical partition(s) with capacity deficit(s) while proportionally lowering the partition processing capacity limit(s) of logical partition(s) with capacity surplus(es).

The steps of method claims as described herein are performed by a computer and necessarily involve the use of computer processor hardware executing program instructions stored in a tangible data storage medium.

What is claimed is:

1. A method for managing mainframe computer system usage comprising:
   monitoring processing capacity usage of first and second logical partitions in executing a plurality of workload tasks, the first and second logical partitions both defined as being within a first group having a first group policy defined therefor, the first group policy utilizing at least two different time criticality levels applicable to both the first and second logical partitions, the first group also utilizing first and second capacity usage limits applicable, respectively, to the first and second logical partitions;
   determining, for each of the first and second logical partitions, based on the processing capacity usage monitoring, 4 hour rolling average processing capacity usages at the least two different time criticality levels;
   determining, based on the processing capacity usage monitoring and the first group policy, if either of the 4 hour rolling average processing capacity usages of the first and second logical partitions will exceed its respective capacity usage limit;
   if one of the first and second logical partitions is determined to exceed its respective capacity usage limit, automatically adjusting the first and second partition processing capacity limits to allocate processing capacity therebetween, based on the time criticality level processing capacity usage determination, to ensure that processing capacity is made available to workload tasks at a higher of the at least two time criticality levels before workload tasks at a lower of the at least two time criticality levels.

2. A non-transitory tangible data storage medium encoded with program instructions to perform the method of claim 1 when executed by a computer system.

3. The method of claim 1, wherein, if it is determined that no workload tasks in the higher of the at least two time criticality levels will have insufficient capacity, then no adjustment of the first and second partition processing capacity limits is performed.

4. The method of claim 1, wherein the at least two time criticality levels are distinct from Workload Manager (WLM) importance levels of the first and second logical partitions.

5. The method of claim 1, wherein the time criticality level processing capacity usage determination includes projecting anticipated future processing capacity usage.

6. The method of claim 5, wherein projecting anticipated future processing capacity usage is performed with a lower margin of error for the higher of the at least two time criticality levels than for the lower of the at least two time criticality levels.

7. The method of claim 1, wherein the monitoring of processing capacity usage utilizes first and second agents installed on the first and second logical partitions, respectively.

8. The method of claim 7, wherein the determinations about exceeding the first and second capacity usage limits and adjustments thereto utilize a policy controller installed on one of the first and second logical partitions in communication with the first and second agents.

9. The method of claim 8, wherein the first and second policy agents implement adjustments dictated by the policy controller through a hardware management console (HMC) of the mainframe computer system.

* * * * *